(12) United States Patent
Jha

(10) Patent No.: US 9,745,079 B2
(45) Date of Patent: Aug. 29, 2017

(54) AIRCRAFT LIGHT UNIT AND AIRCRAFT HAVING SUCH AIRCRAFT LIGHT UNIT

(71) Applicant: Goodrich Lighting Systems GmbH, Lippstadt (DE)

(72) Inventor: Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 136 days.

(21) Appl. No.: 14/554,580

(22) Filed: Nov. 26, 2014

(65) Prior Publication Data

US 2015/0166197 A1 Jun. 18, 2015

(30) Foreign Application Priority Data

Dec. 17, 2013 (EP) ..................................... 13197774

(51) Int. Cl.
*B64D 47/06* (2006.01)
*B64F 5/00* (2017.01)
(Continued)

(52) U.S. Cl.
CPC ............... *B64D 47/06* (2013.01); *F21V 5/04* (2013.01); *G02B 19/0028* (2013.01);
(Continued)

(58) Field of Classification Search
CPC ............ G02B 27/0955; G02B 19/0028; G02B 19/0061; B64D 27/06; B64D 2203/00;
(Continued)

(56) References Cited

U.S. PATENT DOCUMENTS 6,179,448 B1 * 1/2001 Johnson .................. F21V 19/02
362/276
7,055,994 B2 * 6/2006 Martin .................... B64D 47/06
315/77
(Continued)

FOREIGN PATENT DOCUMENTS

WO 0071417 A1 11/2000
WO 02099333 A1 12/2002
(Continued)

OTHER PUBLICATIONS

European Search Report for Application No. EP13197774. Mailed on Mar. 21, 2014. 9 Pages.

*Primary Examiner* — Anh Mai
*Assistant Examiner* — Arman B Fallahkhair
(74) *Attorney, Agent, or Firm* — Cantor Colburn LLP

(57) ABSTRACT

An aircraft light unit (2), has a support portion (4), a light source having at least one LED (6), the light source being arranged on the support portion (4) and in operation emitting light with a source-side light intensity distribution, and an optical element (8) for transforming the source-side light intensity distribution into an output light intensity distribution. The optical element (8) has at least two transformation segments (10, 20, 30), covering different angular ranges of the source-side light intensity distribution in a first cross-sectional plane. The at least two transformation segments (10, 20, 30) include a first transformation segment (10), with the light from the light source experiencing total internal reflection within the optical element (8) in the first transformation segment (10) and being bundled in a peak region of the output light intensity distribution, and at least one further transformation segment (20, 30), with the light from the light source experiencing refraction only in the at least one further transformation segment (20, 30).

15 Claims, 3 Drawing Sheets

(51) Int. Cl.
*F21V 5/04* (2006.01)
*G02B 27/09* (2006.01)
*G02B 19/00* (2006.01)
*H05B 37/03* (2006.01)
*F21W 101/06* (2006.01)
*F21Y 115/10* (2016.01)
*H05B 33/08* (2006.01)

(52) U.S. Cl.
CPC ..... *G02B 19/0061* (2013.01); *G02B 27/0955* (2013.01); *H05B 37/03* (2013.01); *B64D 2203/00* (2013.01); *F21W 2101/06* (2013.01); *F21Y 2115/10* (2016.08); *H05B 33/0893* (2013.01); *Y10T 29/49002* (2015.01)

(58) Field of Classification Search
CPC ........ B64F 5/0081; F21V 13/04; F21V 13/02; F21V 13/12; F21V 7/0091; F21V 7/09; F21V 5/04; F21V 5/08; F21V 5/045
USPC ...... 362/311.02, 311.06, 309, 335, 545, 332, 362/336, 470, 310
See application file for complete search history.

(56) References Cited

U.S. PATENT DOCUMENTS

| | | | |
|---|---|---|---|
| 8,215,814 B2* | 7/2012 | Marcoux | F21V 5/04 362/310 |
| 8,348,475 B2* | 1/2013 | Wilcox | F21V 5/008 362/311.02 |
| 8,469,552 B2* | 6/2013 | Moeller | F21V 5/04 362/311.02 |
| 9,200,765 B1* | 12/2015 | Broughton | F21V 5/08 |
| 9,234,650 B2* | 1/2016 | Dieker | F21V 13/04 |
| 2005/0093718 A1 | 5/2005 | Martin | |
| 2010/0172135 A1 | 7/2010 | Holder et al. | |
| 2010/0302786 A1 | 12/2010 | Wilcox et al. | |

FOREIGN PATENT DOCUMENTS

| | | |
|---|---|---|
| WO | 2010135845 A1 | 12/2010 |
| WO | 2012095242 A1 | 7/2012 |
| WO | 2013169736 A1 | 11/2013 |

* cited by examiner

AIRCRAFT LIGHT UNIT AND AIRCRAFT HAVING SUCH AIRCRAFT LIGHT UNIT

The invention relates to exterior lighting systems for aircraft. In particular, it relates to an aircraft light unit with one or more LED's.

All aircraft have exterior lights. These lights are provided for a wide variety of purposes, such as for allowing the passengers and/or operators to view the outside, for passive visibility, for signalling purposes, etc. In the aircraft industry, exterior lights are highly regulated in terms of the light intensity distributions that are emitted from the lights.

LED light units have become common in the aircraft industry in recent years. In order to satisfy the strict regulations, complex optical structures have been developed that comprise various LED's, reflectors and shutters. These complex structures lead to LED light units that do not satisfy the regulations in an energy-efficient manner.

Accordingly, it would be beneficial to provide an aircraft light unit that makes more efficient use of the LED illuminating capacity. Further, it would be beneficial to provide a method of replacing existing aircraft light units, for example when they are used for a long time or broken, with such improved aircraft light units, while keeping the wiring of the power supply systems.

Exemplary embodiments of the invention include an aircraft light unit, comprising a support portion, a light source having at least one LED, the light source being arranged on the support portion and in operation emitting light with a source-side light intensity distribution, and an optical element for transforming the source-side light intensity distribution into an output light intensity distribution. The optical element has at least two transformation segments, covering different angular ranges of the source-side light intensity distribution in a first cross-sectional plane, the at least two transformation segments comprising a first transformation segment, with the light from the light source experiencing total internal reflection within the optical element in the first transformation segment and being bundled in a peak region of the output light intensity distribution, and at least one further transformation segment, with the light from the light source experiencing refraction only in the at least one further transformation segment.

The provision of various transformation segments allows for adapting the aircraft light unit to provide a desired output light intensity distribution in an energy-efficient manner. In particular, a multiplicity of light output requirements, as are common in the aircraft lighting field, may be satisfied in an energy-efficient manner. Further in particular, light from an extended angular range of the source-side light intensity distribution may be bundled to contribute to or form a peak in the output light intensity distribution. In this way, a particular output direction of the aircraft light unit with a high intensity requirement, such as the forward direction of the aircraft, i.e. the longitudinal direction of the aircraft body, may be provided with the required amount of light in an energy-efficient manner. The total internal reflection within the optical element is an efficient means of achieving the bundling without the need for further optical structures apart from said optical element. Accordingly, the aircraft light unit allows for efficiently forming a peak region in the output light intensity distribution, while at the same time allowing for satisfying further light output requirements through the refraction properties of the optical element in the further transformation segment(s).

It is pointed out that the term total internal reflection does not require the light to stay within the volume of the optical element. Rather, it means that the light from the light source goes through an instance of total internal reflection at a suitable surface of the optical element before leaving the optical element and contributing to the output light intensity distribution. It is further pointed out that the term total internal reflection does not require 100% of the light in the first transformation segment to be internally reflected. It is possible that the transparent nature of the optical element allows for comparably very small quantities of light to pass through and be refracted at the surface of total internal reflection. Such behavior is contemplated to be encompassed by the invention. In other words, the light from the light source experiences substantially total internal reflection in the first transformation segment.

The term source-side light intensity distribution refers to the light intensity distribution emitted by the light source in the absence of further optical structures, in particular in the absence of the optical element. The source-side light intensity distribution is present on the source side of the optical element, i.e. on the inside of the optical element. The source-side light intensity distribution may have an opening angle of 180° in the first cross-sectional plane. In other words, it may cover the entire half plane above the support portion. In yet other words, the source-side light intensity distribution may have an opening angle from −90° to +90° with respect to a principal light emission direction, which is normal to the support portion.

The first cross-sectional plane may be any cross-sectional plane through the aircraft light unit, i.e. any plane that is orthogonal to the support portion of the aircraft light unit. Conveniently, the first cross-sectional plane is a plane through the aircraft light unit that later in use corresponds to a plane for which required light intensity values are defined, such as the horizontal plane. The first cross-sectional plane may run through the center of the aircraft light unit.

According to a further embodiment, said peak region in the output light intensity distribution has an opening angle of less than 20°, in particular between 5° and 15°, more in particular about 10° in the first cross-sectional plane. In this way, a particularly strong bundling of light is achieved, which allows for satisfying high light intensity requirements for narrow angular regions.

According to a further embodiment, the first transformation segment covers an angular range of between 20° and 40°, in particular around 30° of the source-side light intensity distribution in the first cross-sectional plane. In this way, the light of a larger angular range on the light source side is concentrated within the narrow peak region, through which an energy-efficient bundling of light is achieved. An output beam with a small opening angle is created in the peak region, with the beam being fed from a larger angular region of the light source for increased light intensity.

According to a further embodiment, the light from the light source experiences refraction at an inner surface of the optical element in the first transformation segment, before experiencing total internal reflection. In other words, the light from the light source is refracted at the inner surface of the optical element, before it is reflected at the surface of total internal reflection, staying within the body of the optical element, before it is then passed to the outside of the aircraft light unit at the outer surface of the optical element. In this way, the bundling of the light in the first transformation segment is jointly provided by the refraction at the inner surface and the total internal reflection. Accordingly, by providing two optical surfaces, more degrees of freedom are provided for achieving the desired bundling. This allows for providing better-defined and more easy to produce optical surfaces. In particular, it is possible to have the inner surface of the optical element and/or the surface of total internal reflection have the form of a straight line in the first cross-sectional plane, leading to well-defined optical behavior. It is further possible to have the inner surface of the optical element in the first transformation segment and/or the surface of total internal reflection be planar, within and outside of the first cross-sectional plane.

According to a further embodiment, the at least one further transformation segment comprises a second transformation segment, with the light from the light source experiencing refraction at an inner surface of the optical element and refraction at an outer surface of the optical element in the second transformation segment. By providing two refractive surfaces for transforming the source-side light intensity distribution, the light from the at least one LED may be efficiently redirected, while allowing for taking into account additional factors. For example, the inner surface may be shaped to take on exactly the desired amount of light from the light source. In another example, the inner and outer surfaces may be designed in a way to reach the desired transformation, while being easy to produce and/or leading to a low thickness of the optical element.

According to a further embodiment, the inner surface of the optical element is convex, when viewed from the light source, in the second transformation segment. In this way, the portion of the inner surface of the optical element protrudes from the remainder of the inner surface in the second transformation segment, allowing for an increased light reception as compared to a concave structure. Also, the convex structure allows for a collimating or aligning of the light from the light source, through which the desired output light intensity distribution may be conveniently achieved at the outer surface of the second transformation segment. The outer surface of the optical element may be concave, when viewed from outside the aircraft light unit, in the second transformation segment.

According to a further embodiment, the second transformation segment covers an angular range of between 30° and 70°, in particular of between 40° and 60°, more in particular of about 50° of the source-side light intensity distribution in the first cross-sectional plane. In this way, the light of a fairly large angular range is made available for the transformation with the two instances of refraction, as discussed above. A lot of light is available for an efficient transformation with low constraints.

According to a further embodiment, the light leaving the second transformation segment contributes partially to the peak region of the output light intensity distribution and partially to a medium intensity region of the output light intensity distribution. In this way, the large amount of light received by the second transformation segment is split up between the peak region and the medium intensity region, thereby joining with the light from the first transformation segment for a desired light peak and additionally forming an adjacent medium intensity region for satisfying a desired light intensity outside the peak region.

According to a further embodiment, the at least one further transformation segment comprises a third transformation segment, with the light leaving the third transformation segment forming a low intensity region of the output light intensity distribution. In this way, three desired light intensity distribution segments can be formed via the provision of according three transformation segments of the optical element. An individual adaptation of the transformation segments with respect to the respective requirements allows for a particularly efficient use of the available light power and for an individual optimization of the transformation segments with respect to their light transformation, manufacturing properties and material volume.

According to a further embodiment, the medium intensity region of the output light intensity distribution has an opening angle of less than 20°, in particular between 5° and 15°, more in particular about 10° in the first cross-sectional plane.

According to a further embodiment, the low intensity region of the output light intensity distribution has an opening angle of more than 70°, in particular between 80° and 100°, more in particular about 90° in the first cross-sectional plane.

According to a further embodiment, the light from the light source experiences refraction at at least one of the inner surface of the optical element and the outer surface of the optical element in the third transformation segment. In this way, the light distribution may be shaped in a desired way in the third transformation segment. It is also possible that the light experiences refraction both at the inner surface and the outer surface of the optical element, as described above with respect to the second transformation segment. However, it is also possible that one or both of the inner and outer surfaces of the optical element are spherical in the third transformation segment, i.e. that the inner and outer surfaces are sphere segments in the third transformation segment. This allows for an easy production of the optical element and a mere passing on of the source-side light intensity distribution to the outside of the aircraft light unit (assuming that the light source is concentrated at the center of the aircraft light unit).

According to a further embodiment, the second and third transformation segments are arranged adjacent to each other and at least one of the inner surface and the outer surface of the optical element has a step between the second and third transformation segments. In mathematical terms, a non-differentiable transition is provided on the inner surface or on the outer surface or on both surfaces between the second and third transformation segments. This allows for an entirely independent shaping of the two segments and an independent optimization thereof.

According to a further embodiment, the output light intensity distribution satisfies a set of Federal Aviation Regulation (FAR) requirements for forward navigation lights. In other words, the output light intensity distribution exceeds the required light intensity thresholds for particular angles, as set forward by the FAR. The output light intensity distribution may further comply with required light emission cut-offs at particular angles, as set forward by the FAR. For example, the output light intensity distribution may satisfy the requirements set forth in FAR 25.1391, FAR 25.1393, FAR 25.1395, etc.

According to a further embodiment, the output light intensity distribution is an envelope of a plurality of required light intensity values. For example, such an envelope curve may be derived from a plurality of discrete desired light intensity values, as given in the FAR. The provision of the envelope curve allows for the production of continuous inner and outer surfaces of the optical element, at least within the individual transformation segments. Such continuous surfaces allow for an easier production, for example through injection-moulding, in particular due to their comparably easy parting from a mould.

According to a further embodiment, the light source is one single LED. Above described transformation with the plurality of transformation segments allows for a satisfaction of light intensity requirements in such an energy-efficient manner that one single LED may be sufficient for achieving the required illumination for many applications. This in turn keeps the energy consumption and cost of the aircraft light unit low. The one single LED may have a Gaussian light intensity distribution.

According to a further embodiment, a space between the light source and the optical element is free of shutters and reflectors. In this way, the whole illumination capacity of the light source is used for achieving the desired output light intensity distribution. No light and accordingly no energy is wasted, leading to superior energy efficiency.

According to a further embodiment, the optical element is the only optical element of the aircraft light unit. Since all transforming of the light intensity distribution may be achieved with said optical element, the optical structure of the aircraft light unit is easy to produce and easy to replace, should damage occur. No aligning and adapting of individual optical components is necessary.

According to a further embodiment, the optical element is produced in an injection molding process, in particular in a 2-component mold.

According to a further embodiment, the optical element if from Polycarbonate or from Poly(methyl methacrylate), also referred to as PMMA. The refractive indices of these materials are around 1.5, in particular between 1.45 and 1.6. It is pointed out that different materials with different refractive indices may be used for the optical element.

According to a further embodiment, the aircraft light unit further comprises an LED performance detection sensor arranged outside of the optical element, wherein the LED performance detection sensor is adapted to receive stray light not reflected in the first transformation segment and to evaluate the intensity of the stray light in order to assess the strength of the at least one LED. In this way, the upcoming end of the life cycle of the at least one LED can be detected. A so called near end of light detection can be carried out. The LED performance detection sensor may issue a signal or may be read out periodically in order to determine if the at least one LED of the aircraft light unit should be replaced. In this way, a decrease of the light unit performance below the required light intensity values can be prevented. By relying on stray light only, the detection mechanism does not reduce the illumination capacity and energy efficiency of the aircraft light unit.

Exemplary embodiments of the invention further include an aircraft comprising an aircraft light unit, as described in any of the embodiments above, the aircraft light unit being disposed in the exterior of the aircraft, in particular in a wing tip region of the aircraft. The aircraft light unit may be a navigation light, in particular a forward navigation light. Above modifications and advantages equally relate to the aircraft. The aircraft may be an air plane or a rotary wing aircraft.

According to a further embodiment, the aircraft light unit is arranged in such a way that a principal light emission direction of the light source is at an angle of between 20° and 40°, in particular of about 30° with respect to the longitudinal direction of the aircraft body. With the principal light emission direction being in general orthogonal to the support portion, it can also be said that the support portion is at an angle of between 50° and 70°, in particular of about 60° with respect to the longitudinal direction of the aircraft body. In this way, the illumination capacity of the aircraft light unit can be used in above described energy-efficient manner, while allowing for an effective way of complying with required illumination cut-offs. In particular, the requirement for navigation lights not to emit light towards the aircraft body can be complied with. Also, the cut-off at 110° with respect to the longitudinal direction of the aircraft body may be effectively satisfied with the angled arrangement of the aircraft light unit.

According to a further embodiment, the peak region of the output light intensity distribution is within an angle of less than 20°, in particular within an angle of 0° to 15° and more in particular within an angle of 0° to 10° of the longitudinal direction of the aircraft body. In this way, the peak region of the aircraft light unit coincides with the forward navigation direction of the aircraft.

According to a further embodiment, the first cross-sectional plane is a horizontal plane.

Exemplary embodiments of the invention further include a method of replacing a used light unit in an aircraft with an aircraft light unit, as described in any of the embodiments above, the method comprising the steps of disconnecting the used light unit from a power source, and connecting the aircraft light unit, as described in any of the embodiments above, to the power source.

Embodiments of the invention are described in greater detail below with reference to the figures, wherein:

FIG. 1 shows a cross-section through an exemplary aircraft light unit in accordance with the invention.

FIG. 2 schematically shows an air plane with the exemplary aircraft light unit of FIG. 1 installed in the left wing tip region as well as the output light intensity distribution thereof in the horizontal plane.

Figure 1:
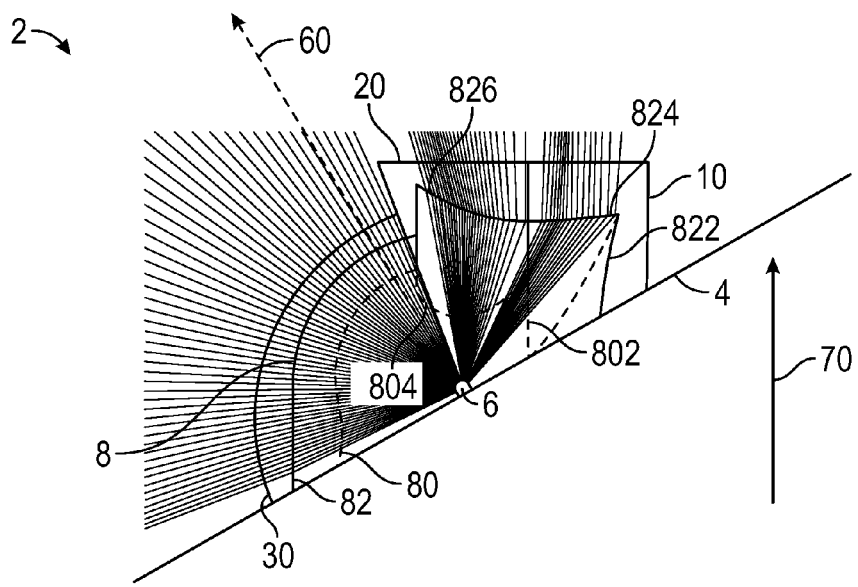

FIG. 1 shows a cross-sectional view of an exemplary aircraft light unit 2 in accordance with the invention. The aircraft light unit 2 is shown to be oriented in a way as it is oriented after being assembled to the aircraft during use. In particular, it is shown that the aircraft light unit 2 is at an angle with respect to a longitudinal direction 70 of the aircraft body. The drawing plane of FIG. 1 corresponds to a cross-sectional plane through the aircraft light unit 2 that comes to lie horizontally when the aircraft light unit 2 is in use. Further, the aircraft light unit 2 is designed to be a left-side navigation light unit, for example to be arranged in the wing tip region of a left wing of an aircraft.

The aircraft light unit 2 has a support portion 4, an LED 6, which forms the light source of the aircraft light unit 2 by itself, and an optical element 8. The optical element 8 is disposed over the LED 6 and is fastened to the support portion 4. As will become clear from the description of FIG. 3 below, the optical element 8 fully encloses the LED 6 and affects all light emitted from the LED 6.

The LED 6 has a source-side light intensity distribution, which is Gaussian. A principle light emission direction 60 of the LED 6 is orthogonal to the support portion 4. The principle light emission direction 60 refers to the direction of the highest light intensity of the LED 6 in the absence of all optical elements.

The drawing plane of FIG. 1 is referred to as the first cross-sectional plane, as it is a first plane for which a desired output light intensity distribution is achieved via the optical element 8. It is possible that the first cross-sectional plane is the only plane for which desired output light intensity values are defined. It is, however, also possible that further desired output light intensity values are defined for other planes, such as described below.

The optical element 8 is a solid structure having an inner surface 80 and an outer surface 82. The optical element 8 has three distinct transformation segments, namely a first transformation segment 10, a second transformation segment 20, and a third transformation segment 30. The transformation segments 10, 20, 30 transform a source-side light intensity distribution into an output light intensity distribution. The extensions of the transformation segments are defined in terms of their angular regions on the inner surface 80. In particular, the first transformation segment 10 extends over an angle of 30° of the inner surface. This angular range of 30° extends from +90° to +60°, when measured from the principle light emission direction 60. The second transformation segment 20 extends over an angle of 50°. In particular, the second transformation segment extends from +60° to +10°, when measured with respect to the principle light emission direction 60. The third transformation segment 30 extends over an angle of 100°. In particular it extends from +10° to −90°, when measured with respect to the principle light emission direction 60.

The paths of the light rays are described as follows with respect to the individual transformation segments. Within the first transformation segment 10, the light rays from the LED 6 are first slightly refracted at the inner surface 80 of the optical element 8. In the cross-sectional plane of FIG. 1, the inner surface 80 has a straight section in the first transformation segment 10, denoted with reference numeral 802. After being slightly refracted, the light rays hit a plane of total internal reflection, denoted with reference numeral 822. At this plane, the light rays are completely reflected towards the top of the drawing plane of FIG. 1, i.e. roughly into the longitudinal direction of the aircraft body 70. The surface 822 of total internal reflection is part of the outer surface 82 of the optical element 8. In the cross-sectional plane of FIG. 1, the surface 822 has a straight contour. As the surface 822 of total internal reflection is not planer outside of the drawing plane of FIG. 1, but has a curved shape, the outside contour of the outer surface 82 behind the drawing plane of FIG. 1 is also visible in FIG. 1. After experiencing total internal reflection, the light rays pass a straight portion of the outer surface 82, denoted with reference numeral 824. Only minimal refraction takes place at this surface 824. The light rays leave the aircraft light unit 2 within a narrow angular range of less than 10° with respect to the longitudinal direction 70 of the aircraft body. This narrow range between 0° and 10° with respect to the longitudinal direction 70 of the aircraft body is the peak region of the output light intensity distribution.

In the second transformation segment 20, the light rays from the LED 6 hit a convex portion 804 of the inner surface 80. The portion 804 is convex when viewed from the LED 6, i.e. when viewed from the light source. The surface 804 has such a convex shape that the light rays are substantially collimated within the optical element 8 in the second transformation segment 20. In other words, the light rays travel through the optical element 8 in an aligned manner in the second transformation segment 20. The outer surface 82 of the optical element 8 has a concave portion 826 in the second transformation segment 20. The surface 826 is concave when viewed from the outside of the aircraft light unit 2. This surface 826 disperses the collimated light from within the optical element 8 and distributes the light rays across an angular range of 20°. In particular, the light rays are divided up between the longitudinal direction 70 of the aircraft body and an angle of 20° thereto. In this way, the light rays leaving the second transformation segment 20 contribute to above discussed peak region in the output light intensity distribution and also form a medium intensity region between 10° and 20° with respect to the longitudinal direction 70 of the aircraft body.

The inner surface 80 and the outer surface 82 are mainly spherical in the third transformation segment 30. In particular, they are both spherical from the border with the second transformation segment 20 to a chamfer region close to the support portion 4. In this chamfer region, the light rays from the light source 6 are somewhat diverted from the support portion through respective chamfer surfaces at the inner surface 80 and at the outer surface 82. In this way, the light rays leaving the third transformation segment 30 are within an angular range of between 20° and 110° with respect to the longitudinal direction 70 of the aircraft body. This angular region forms a low intensity region of the output light intensity distribution.

With this set-up, the optical element 8 allows for a bundling and diverting of light from the LED 6 in such a way that the FAR requirements for forward navigation lights are satisfied.

Figure 2:
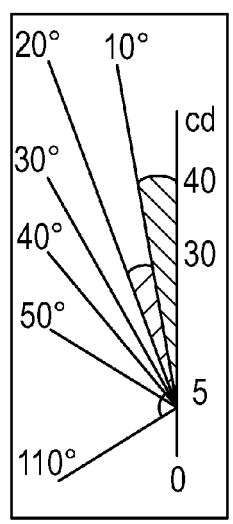

FIG. 2 shows a schematic illustration of an aircraft having the aircraft light unit 2 of FIG. 1 installed in the wing tip region of the left wing. It is illustrated that the illumination covers an angular range between the longitudinal direction of the aircraft and an angle of 110° thereto. It is further illustrated that the aircraft light unit has three distinct output regions in the output light intensity distribution, namely a peak region between the longitudinal direction of the aircraft body and an angle of 10° thereto, a medium light intensity region between 10° and 20°, and a low light intensity region between 20° and 110°. The creation of these regions has been described above with respect to FIG. 1.

Figure 3:
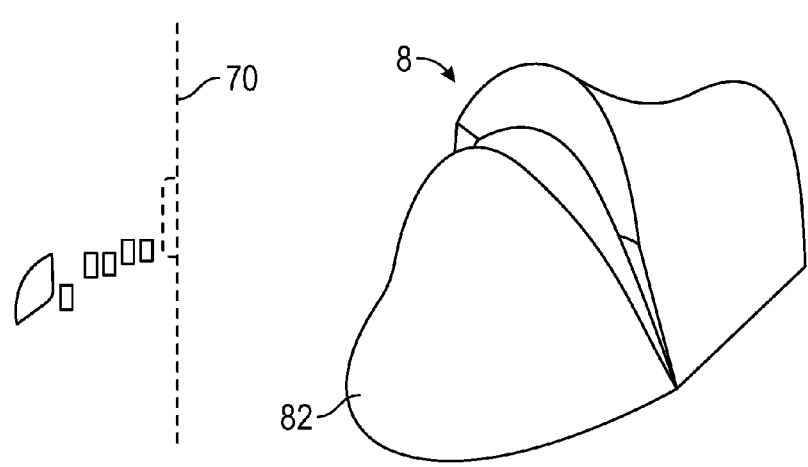
FIG. 3 shows a perspective three-dimensional view of the optical element of the exemplary aircraft light unit of FIG. 1.

FIG. 3 shows the optical element 8 of FIG. 1 in a perspective three-dimensional view. As the optical element 8 is shown from the outside, only the outer surface 82 is visible in this view. It can be seen that the optical element 8 does not only effect the light intensity distribution in the first cross-sectional plane, i.e. in the horizontal plane during use, but also shapes the output light intensity distribution for other vertical angles. The particulars with respect to the vertical output light intensity distribution will be described below with respect to FIG. 5.

Figure 4:
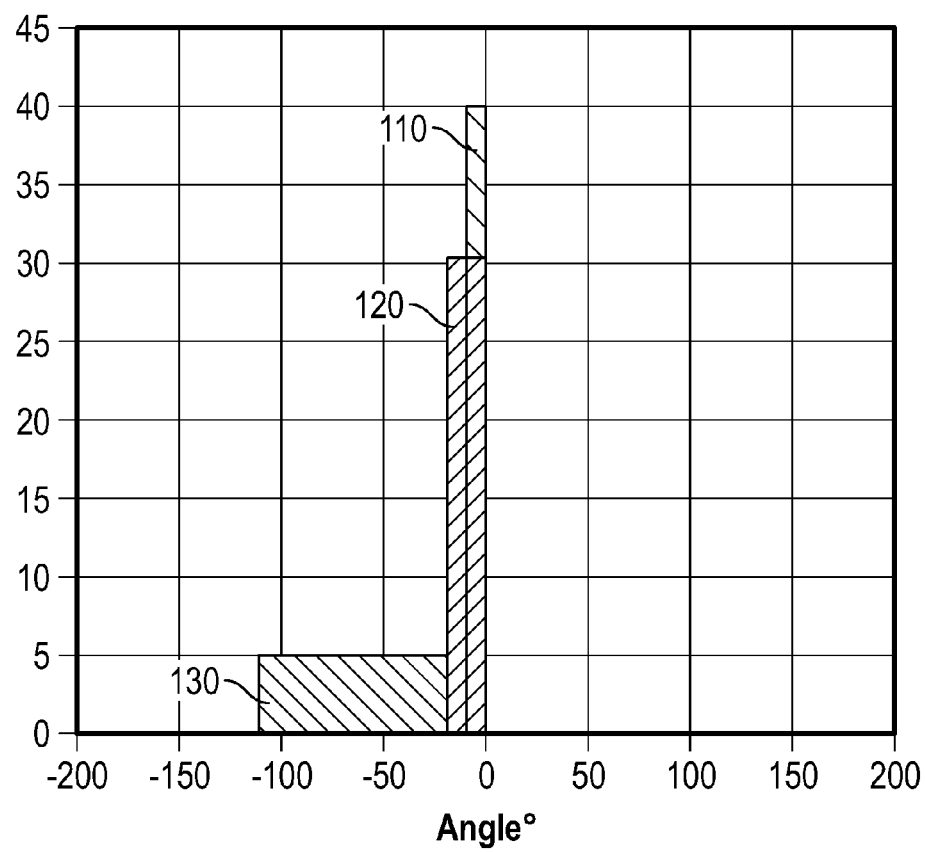
FIG. 4 shows exemplary light intensity requirements for a horizontal plane for an aircraft light unit.

FIG. 4 shows the light intensity distribution across the first cross-sectional plane in diagrammatic form. A peak region 110, a medium intensity region 120, and a low intensity region 130 are shown for the angular ranges of the output light intensity distribution discussed above. It is pointed out that this step function represents minimum required values. While the aircraft light unit 2 of FIG. 1 achieves to satisfy these minimum required values, it may also exceed these values. There may be a constant factor of exceeding the requirements, or the exceeding may be of different magnitude at different points of the distribution. For example, the actual output light intensity distribution may be an enveloping curve of the requirements shown in FIG. 4.

Figure 5:
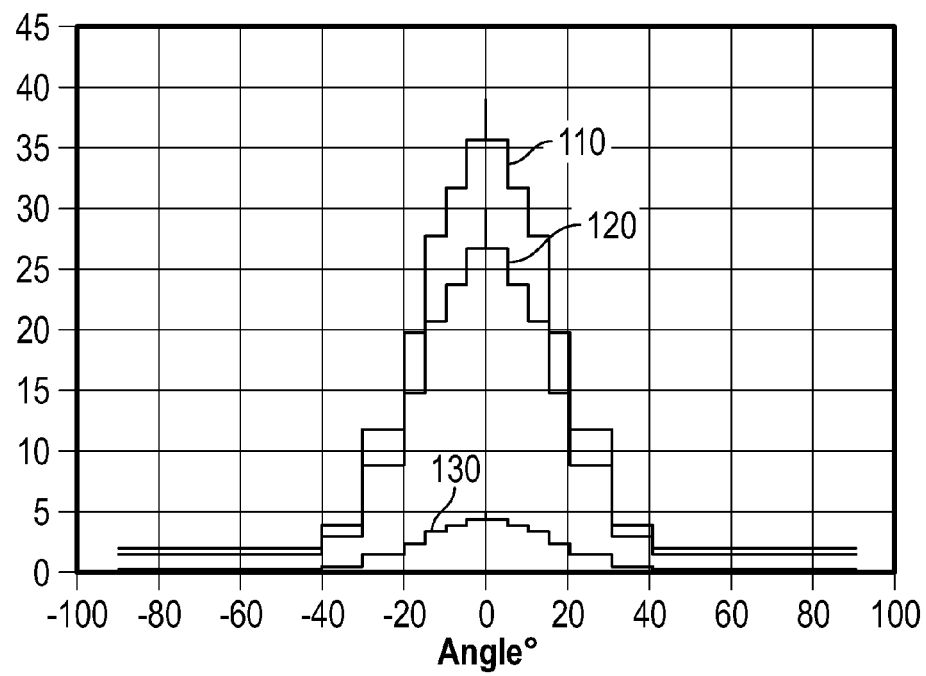
FIG. 5 shows exemplary light intensity requirements for a vertical plane for an aircraft light unit.

FIG. 5 shows the vertical distribution of the desired output light intensity distribution for three different vertical planes. In other words, the required output light intensity distribution along further cross-sectional planes, namely a second, third and fourth cross-sectional planes, are shown. The second, third and fourth cross-sectional planes are vertical planes through the center of the aircraft light unit, i.e. through the center of the LED 6. As can be seen, the light intensity is greatest in the horizontal direction, while decreasing both towards the top and towards the bottom. This behaviour is true for all three depicted light intensity distributions. The three desired light intensity distributions represent different vertical intensity distributions for the peak region 110, the medium intensity region 120, and the low intensity region 130, discussed above.

Again, the curves of FIG. 5 illustrate the required intensity values. With the light source having a continuous, in general Gaussian, source-side light intensity distribution and the optical element 8 having a continuous contour for the vertical planes, the resulting light intensity distribution across the vertical planes is a continuous curve, in the present case an enveloping curve of the shown requirements of FIG. 5.

Figure 6:
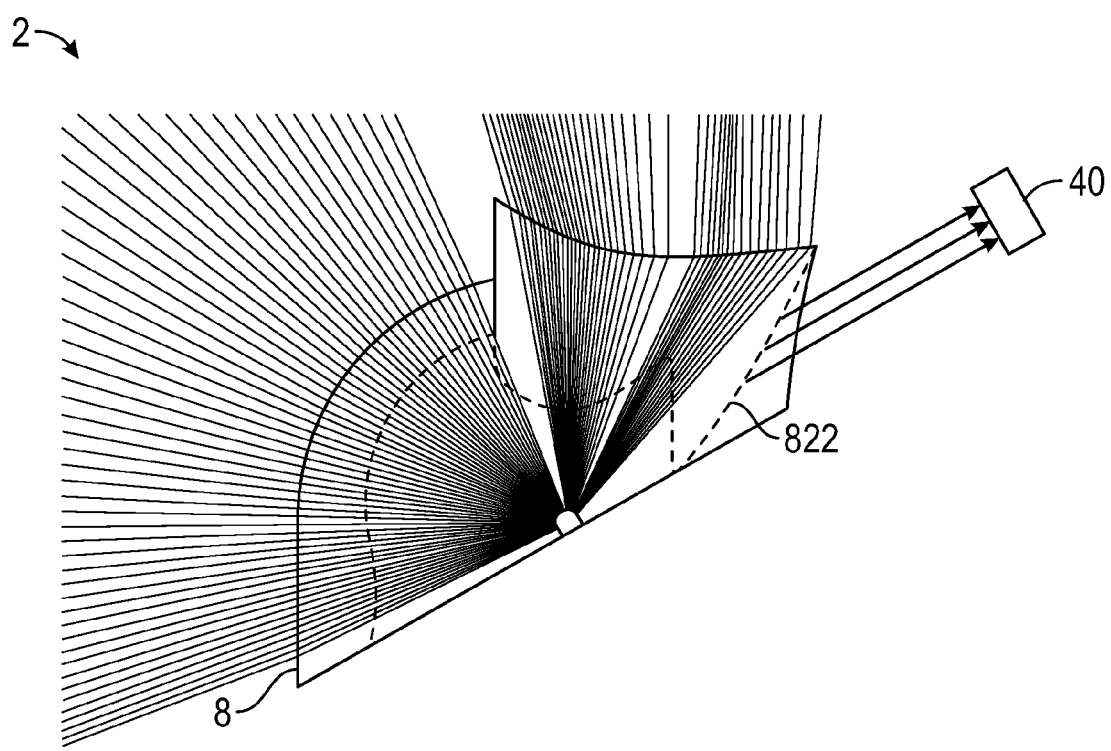
FIG. 6 shows a modification of the exemplary aircraft light unit of FIG. 1.

FIG. 6 again shows the aircraft light unit 2 of FIG. 1, the details of which were described above. However, FIG. 6 shows the additional element of an LED performance detection sensor 40. This detection sensor 40 makes use of the non-perfect internal reflection at the surface 822. A very small amount of stray light is not reflected at this surface 822, but instead passes therethrough. Said light is received by the detection sensor 40 and evaluated. The detection sensor 40 is calibrated at the beginning of the life cycle of the LED 6. It is therefore able to deduce from the intensity of the stray light received if the LED 6 has degraded through ageing to a critical point. At such a critical point, the aircraft light unit 2 is no longer able to satisfy the light intensity requirements it is designed for. The detection sensor 40 is able to measure and indicate a near end of life condition of the LED. The evaluations of the detection sensor 40 may either be periodically read out during maintenance, or the detection sensor 40 may be able to generate a signal by itself for communicating such near end of life condition to an outside control entity. Accordingly, a necessary replacement of the LED 6 is possible without carrying out complicated light intensity measurements over the whole output range.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft, comprising:
an aircraft light unit, wherein the aircraft light unit comprises:
   a support portion,
   a light source having at least one LED, the light source being arranged on the support portion and in operation emitting light with a source-side light intensity distribution, and
   an optical element for transforming the source-side light intensity distribution into an output light intensity distribution,
   wherein the optical element has at least two transformation segments, covering different angular ranges of the source-side light intensity distribution in a first cross-sectional plane, the at least two transformation segments comprising:
      a first transformation segment, having a first light entry surface, a total internal reflection surface and a first light exit surface, with the light from the light source experiencing total internal reflection within the optical element at the total internal reflection surface in the first transformation segment and being bundled in a peak region of the output light intensity distribution, wherein the first transformation segment covers an angular range of between 20° and 40° of the source-side light intensity distribution in the first cross-sectional plane and wherein said peak region in the output light intensity distribution has an opening angle of between 5° and 15° in the first cross-sectional plane, and
      at least one further transformation segment, having at least one further light entry surface and at least one further light exit surface, with the light from the light source experiencing refraction only in the at least one further transformation segment,
   wherein the aircraft light unit is disposed in a wing tip region of the aircraft; and
   wherein the aircraft light unit is arranged in such a way that a principal light emission direction of the light source is at an angle of between 20° and 40° with respect to the longitudinal direction of the aircraft body.

2. The aircraft according to claim 1, wherein the at least one further transformation segment of the aircraft light unit comprises a second transformation segment, having a second light entry surface and a second light exit surface, with the light from the light source experiencing refraction at the second light entry surface and refraction at the second light exit surface in the second transformation segment.

3. The aircraft according to claim 2, wherein the second light entry surface of the optical element of the aircraft light unit is convex, when viewed from the light source, in the second transformation segment.

4. The aircraft according to claim 3, wherein the second transformation segment of the aircraft light unit covers an angular range of between 30° and 70° of the source-side light intensity distribution in the first cross-sectional plane.

5. The aircraft according to claim 4, wherein the at least one further transformation segment of the aircraft light unit comprises a third transformation segment, having a third light entry surface and a third light exit surface, with the light leaving the second transformation segment contributing partially to the peak region of the output light intensity distribution and partially to a medium intensity region of the out-put light intensity distribution and with the light leaving the third transformation segment forming a low intensity region of the output light intensity distribution.

6. The aircraft according to claim 3, wherein the second transformation segment of the aircraft light unit covers an angular range of between 40° and 60° of the source-side light intensity distribution in the first cross-sectional plane.

7. The aircraft according to claim 3, wherein the second transformation segment of the aircraft light unit covers an angular range of about 50° of the source-side light intensity distribution in the first cross-sectional plane.

8. The aircraft according to claim 1, wherein said peak region in the output light intensity distribution of the aircraft light unit has an opening angle of about 10° in the first cross-sectional plane.

9. The aircraft according to claim 1, wherein the first transformation segment of the aircraft light unit covers an angular range of around 30° of the source-side light intensity distribution in the first cross-sectional plane.

10. The aircraft according to claim 1, wherein the light source of the aircraft light unit is one single LED.

11. The aircraft according to claim 1, wherein a space between the light source and the optical element of the aircraft light unit is free of shutters and reflectors.

12. The aircraft according to claim 1, wherein the aircraft light unit further comprises a LED performance detection sensor arranged outside of the optical element, wherein the LED performance detection sensor is adapted to receive stray light not reflected in the first transformation segment and to evaluate the intensity of the stray light in order to assess the strength of the at least one LED.

13. The aircraft according to claim 1, wherein the aircraft light unit is arranged in such a way that a principal light emission direction of the light source is at an angle of about 30° with respect to the longitudinal direction of the aircraft body.

14. The aircraft according to claim 1, wherein the first cross-sectional plane is a horizontal plane.

15. Method of replacing a used light unit in an aircraft with an aircraft light unit according to claim 1, the method comprising the steps of:
    disconnecting the used light unit from a power source, and
    connecting the aircraft light unit according to claim 1 to the power source.

\* \* \* \* \*